United States Patent
Mohamadi

(10) Patent No.: US 9,316,732 B1
(45) Date of Patent: Apr. 19, 2016

(54) STANDOFF SCREENING APPARATUS FOR DETECTION OF CONCEALED WEAPONS

(71) Applicant: Farrokh Mohamadi, Irvine, CA (US)

(72) Inventor: Farrokh Mohamadi, Irvine, CA (US)

(73) Assignee: Farrokh Mohamadi, Irvine, CA (US)

(*) Notice: Subject to any disclaimer, the term of this patent is extended or adjusted under 35 U.S.C. 154(b) by 490 days.

(21) Appl. No.: 13/794,449

(22) Filed: Mar. 11, 2013

Related U.S. Application Data

(60) Provisional application No. 61/620,802, filed on Apr. 5, 2012.

(51) Int. Cl.
| | |
|---|---|
| *G01S 13/88* | (2006.01) |
| *G01S 13/89* | (2006.01) |
| *G01S 7/41* | (2006.01) |
| *G01S 13/04* | (2006.01) |
| *G01S 7/02* | (2006.01) |

(52) U.S. Cl.
CPC ............ *G01S 13/887* (2013.01); *G01S 7/411* (2013.01); *G01S 13/89* (2013.01); *G01S 7/024* (2013.01); *G01S 13/04* (2013.01)

(58) Field of Classification Search
CPC ..... G01S 7/026; G01S 13/887; G01S 13/888; G01S 13/89; G01S 13/003; G01S 13/04; G01S 13/885; G01S 7/024; G01S 7/41; G01S 7/411; H01Q 21/0006; H01Q 21/061; H01Q 21/08; H01Q 9/27
USPC .............................................. 342/22, 27, 179
See application file for complete search history.

(56) References Cited

U.S. PATENT DOCUMENTS

| | | | | | |
|---|---|---|---|---|---|
| 4,931,808 | A * | 6/1990 | Lalezari | ................. | H01Q 13/26 343/753 |
| 5,745,082 | A * | 4/1998 | Alder | ....................... | H01Q 3/44 343/753 |
| 5,859,609 | A * | 1/1999 | Sheen | ...................... | A61B 5/05 342/179 |
| 6,870,503 | B2 | 3/2005 | Mohamadi | | |
| 6,885,344 | B2 | 4/2005 | Mohamadi | | |
| 6,963,307 | B2 | 11/2005 | Mohamadi | | |
| 6,982,670 | B2 | 1/2006 | Mohamadi | | |
| 7,034,746 | B1 * | 4/2006 | McMakin | .............. | G01S 7/024 342/175 |

(Continued)

OTHER PUBLICATIONS

Yazhou Wang; Fathy, A.E., "Three-dimensional through wall imaging using an UWB SAR," Antennas and Propagation Society International Symposium (APSURSI), 2010 IEEE, vol., no., pp. 1,4, Jul. 11-17, 2010.*

*Primary Examiner* — John B Sotomayor
(74) *Attorney, Agent, or Firm* — Haynes and Boone, LLP

(57) ABSTRACT

A walk-through screening station scans individuals to detect contraband such as a concealed weapon or improvised explosive device (IED) using ultra wideband (UWB) radar sensing and imaging systems employing wafer scale active array antennas. UWB radar and advanced imaging technology enable automated threat recognition and display for monitoring personnel. The station may scan subjects passing close to or within an aperture width of an array of radar transceivers. Direct calibration by use of reflectors positioned at known locations in the image may be used to implement scanning and imaging so close to the array. The scanning station may employ an easy-to-set-up pair of panels that may be readily deployed by security providers wherever access control—such as to a meeting place or transportation boarding—is needed. Imaging and display processing may provide an abstract display—such as a stick figure representation of anatomy—to address privacy issues and concerns.

20 Claims, 14 Drawing Sheets

(56) References Cited

U.S. PATENT DOCUMENTS

| | | |
|---|---|---|
| 7,126,541 B2 | 10/2006 | Mohamadi |
| 7,126,542 B2 | 10/2006 | Mohamadi |
| 7,126,554 B2 | 10/2006 | Mohamadi |
| 7,253,766 B2 * | 8/2007 | Foote .................. G01S 13/003 342/179 |
| 7,321,339 B2 | 1/2008 | Mohamadi |
| 7,352,324 B2 | 4/2008 | Mohamadi |
| 7,365,672 B2 * | 4/2008 | Keller ................ G01N 21/3581 342/179 |
| 7,414,577 B2 | 8/2008 | Mohamadi |
| 7,542,005 B2 | 6/2009 | Mohamadi |
| 7,610,064 B2 | 10/2009 | Mohamadi |
| 7,830,989 B2 | 11/2010 | Mohamadi |
| 7,839,283 B2 | 11/2010 | Mohamadi |
| 7,884,757 B2 | 2/2011 | Mohamadi et al. |
| 7,884,776 B2 | 2/2011 | Mohamadi |
| 8,154,339 B2 | 4/2012 | Zolghadri et al. |
| 8,248,293 B2 * | 8/2012 | Kroning ................ G01S 7/025 342/118 |
| 8,674,875 B2 * | 3/2014 | Carter .................. G01S 13/003 342/118 |
| 2002/0063657 A1 * | 5/2002 | Shuch ...................... H01Q 3/26 342/362 |
| 2007/0205936 A1 * | 9/2007 | McMakin ............... G01S 7/026 342/22 |
| 2010/0109941 A1 * | 5/2010 | Vacus ...................... G01S 7/41 342/179 |
| 2010/0207803 A1 * | 8/2010 | McMakin ............... G01S 7/026 342/22 |
| 2010/0225520 A1 | 9/2010 | Mohamadi et al. |
| 2010/0295718 A1 * | 11/2010 | Mohamadi ............. G01S 7/026 342/22 |
| 2012/0001674 A1 | 1/2012 | Mohamadi et al. |
| 2013/0113649 A1 * | 5/2013 | Trishaun ................ G01S 13/04 342/22 |
| 2013/0162490 A1 * | 6/2013 | Blech .................. H01Q 15/002 343/754 |
| 2013/0307716 A1 * | 11/2013 | Mohamadi ............ G01S 13/887 342/22 |

\* cited by examiner

STANDOFF SCREENING APPARATUS FOR DETECTION OF CONCEALED WEAPONS

CROSS REFERENCE TO RELATED APPLICATIONS

This application claims the benefit of priority from U.S. Provisional Patent Application No. 61/620,802, filed Apr. 5, 2012, which is incorporated by reference.

BACKGROUND

1. Technical Field

Embodiments of the present invention generally relate to radar imaging systems and, more particularly, to security screening of individuals using ultra wideband radar incorporating integrated wafer scale, right hand circularly polarized (RHCP) and left hand circularly polarized (LHCP) antenna arrays.

2. Related Art

An important security issue for protection of individuals in public places—such as public gatherings, voting lines, entrances of stadiums, government agency offices, religious gathering places, banks, markets, airports, schools, and government facilities, for example—is detection of hidden objects, e.g., objects such as weapons or improvised explosive devices (IED) that may be carried by a person and concealed, for example, underneath or within clothing or in luggage or other hand-carried items. X-ray technology has been used, for example, for airport screening but presents a number of issues, such as cumulative over exposure to radiation for airport and airline personnel and concerns over personal privacy, that have led to a search for other technologies and methods for addressing these security issues. An additional need for readily deployable detectors may arise for places where such detection may not normally be in use or available—such as public gatherings, voting lines, entrances of stadiums, religious gathering places, banks, and markets, for example.

Figure 1:
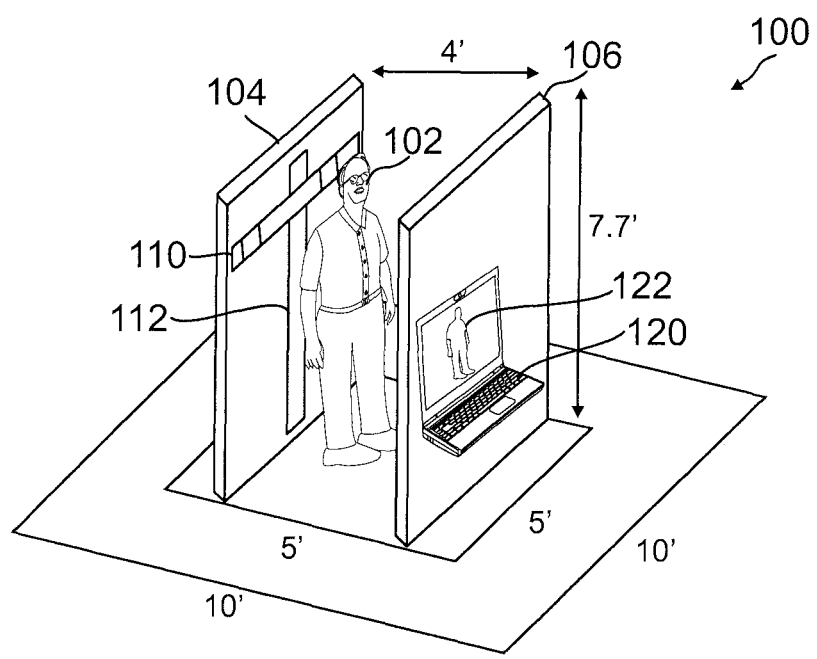
FIG. 1 is a perspective view diagram illustrating a scanning system, in accordance with an embodiment of the present disclosure.

Embodiments of the present disclosure and their advantages are best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

Broadly speaking, methods and systems are provided in one or more embodiments for detecting concealed weapons and other contraband using ultra wideband (UWB) radar sensing and imaging systems that employ wafer scale (e.g., less than 2.0 inches in side dimension for the antenna array) active array antennas. Such small scale UWB radar sensing and imaging systems can find application to many types of security concerns, such as screening people for concealed weapons (including non-metallic weapons) or explosives at airports and other public buildings. One or more embodiments may provide a walk-through scanning station for screening individuals that can detect, for example, an improvised explosive device (IED) concealed on a person, yet may be considered as being non-invasive of privacy. The scanning station may employ an easy-to-set-up pair of panels that may require no more than 15 minutes of installation time in order to be ready to be used and that may be readily deployed, for example, around the entrances of stadiums, government agency offices, banks, voting lines, religious gathering places, markets, public gatherings, and high impact assets. One or more embodiments may provide an advanced portable imaging technology with automated threat recognition that may be desirable and of use to government agencies and other security providers.

One or more embodiments may include a system for screening, in which a subject enters a scanning area located between two vertical panels and having, for example, a horizontal footprint of about 3 feet (ft.) by 3 ft. with a vertical height of about 8 ft. The subject may be asked to stand still and then to turn 90 degrees and stand still for about 3 to 5 seconds. The two panels may capture front, back, and side radio frequency (RF) images of the subject employing a V-band RF system. The scanned and captured images from the back, sides, and front of the subject may show any potential threats and their classification on a laptop at a remote location or in the vicinity of the scanning area. The laptop may communicate with the scanning apparatus through a secure connection using, for example, WiFi (e.g., based on Institute of Electrical and Electronics Engineers (IEEE) 802.11 standards) or 4G (e.g., G3/G4 LTE—Generation 3 or Generation 4 Long Term Evolution), and the laptop or scanning apparatus may also be connected to a remote command and monitoring station.

In one or more embodiments, for a security screener application of radar scanner imaging, the area within a distance very close to the antenna aperture (e.g., about 2.0 ft. to the person under screening) may be that which is mostly used. The radiation field of the antenna in this area, which may be characterized by a range that is roughly the same as or smaller than the width of the antenna aperture itself, appears not to be very well investigated in the field of UWB radar imaging, possibly due, at least in part, to the difficulty in measuring signals at such close range. In one or more embodiments, subjects in this area close to or within an aperture width of the antennas (which may also be referred to as the "extreme near-field") may be imaged by the use of several single chip radar transceivers employed in an array. In one or more embodiments, detection and imaging in this extreme near-field may be implemented by direct calibration with the use of reflectors positioned at known locations in the image.

One or more embodiments may include implementation of a fully integrated, FCC compliant scanner including a transmitter (TX) fully integrated with an array of power amplifiers (PA) and corresponding antenna arrays to form spatial power combining and narrow beam forming; and including a receiver (RX) fully integrated with an array of low noise amplifiers (LNA) and corresponding antenna arrays to form spatial power combining from a reflected signal. One or more embodiments may include implementation of an array of polarized miniature antenna elements that enable system capabilities for analysis of target material and differentiation and classification of target material according to radar signature profiles. One or more embodiments may include implementation of a field programmable gate array (FPGA) based processor to process multiplexing transmitted impulse signals and synchronized received reflections for a target (e.g., person's body) subject to the scan. One or more embodiments may provide "stick diagram" presentation coupled with audio alarms or other abstraction of visual screen information from scanned data to circumvent privacy issues and concerns. One or more embodiments may provide significant improvement in size-weight-and-power (SWAP)—e.g., reductions in volume of space occupied by the scanning apparatus; transportation weight of the apparatus; and electrical power consumption—compared to existing x-ray scanners used in airports, for example. One or more embodiments may provide significant improvement in set up time at required at any location of deployment. One or more embodiments may provide scalability to enhance detection resolution by allowing migration to implementations using W-band technology from implementations using, for example, X-band or V-band technology.

One or more embodiments may include implementation of an active antenna array (e.g., antenna-amplifier array) including a fully integrated feed network with associated power amplifiers that transmit (or low noise amplifiers to receive) a radar signal in X-band (e.g., about 8-12 giga-Hertz (GHz)), V-band (e.g., about 40-75 giga-Hertz (GHz)), E-band (e.g., including two bands of about 71-76 and 81-86 GHz), W-band (e.g., about 75-110 GHz), or terahertz (e.g., about 300-3000 GHz) frequency bands. One or more embodiments may employ 5 GHz ultra wideband (UWB) radar operating at 1-6 GHz, for example, or 3-6 GHz. One or more embodiments may include integrated ultra wideband, wafer scale, right hand circularly polarized (RHCP) or left hand circularly polarized (LHCP) antenna elements, using spiral plate antenna elements, for beam forming and beam steering. One or more embodiments may include ultra wideband, wafer scale, RHCP and LHCP antenna arrays in which side lobes are at least 20 decibels (dB) suppressed. One or more embodiments may include ultra wideband, wafer scale, RHCP and LHCP antenna arrays in which cross polarization is at least 20 dB suppressed.

One or more embodiments provide the capability to modify the cross polarization and array gain, and tune the antenna array for optimum insertion loss by controlling spiral design variables. One or more embodiments provide the capability to modify the feed network to tune the antenna array for optimum insertion loss. One or more embodiments may include integration of the wafer scale RHCP layer antenna array with another layer of LHCP array on top (or bottom). In one or more embodiments, integrated RHCP and LHCP layers may operate as a wafer scale antenna module that can transmit through the LHCP (or RHCP) array and receive waves in the LHCP array as well as the RHCP array.

FIG. 1 illustrates a scanning system 100, showing a subject 102 (e.g., an individual person) positioned between a first panel 104 and a second panel 106. Subject 102 may, for example, walk between first panel 104 and second panel 106, and may stop for a brief period of time (e.g., from a few seconds to a minute or two) between the panels. Subject 102 also may turn to face various directions while remaining between first panel 104 and second panel 106. As indicated in FIG. 1, the panels may occupy a "footprint" area approximately 5 ft. by 5 ft. square, with a footprint for the entire system 100 that may be approximately 10 ft. by 10 ft. square, with a space of about 4 ft. wide between first panel 104 and second panel 106, and with the height of each panel being about 7 to 8 ft. The weight of panels 104, 106 may be kept under about 240 pounds (lbs.) to facilitate transportability.

The panels 104, 106 may constructed so as to be readily installed (e.g., set up and secured) in the position shown in about 15 minutes, to be resistant to wind speeds up to about 20 miles per hour (mph). The panels 104, 106 also may be constructed to support the weight of a radar transceiver array 110 and to provide mechanical apparatus 112—such as rails, belt drive, and stepper motor—for moving the array 110 up and down the entire height (or any portion) of panel 104 or panel 106. In an alternative embodiment, radar transceiver array 110 may also be a rectangular array of radar transceivers disposed so as to occupy the entire surface of panel 104 or panel 106 so that no movement of radar transceiver array 110 is needed for scanning subject 102. Radar transceiver array 110 may be provided on both panels 104 and 106. Each radar transceiver of radar transceiver array 110 may be a UWB radar transceiver operating at a center frequency, for example, of about 60 GHz. For each panel, e.g., panel 104 or panel 106, only one of the radar transceivers of radar transceiver array 110 may be used as a transmitter and all of the radar transceivers of radar transceiver array 110 may be used as receivers.

System 100 may also provide a display 120, in communication with radar transceiver array 110, for displaying a processed radar image 122 of subject 102. Display 120 may be attached to or supported in proximity to one of the panels 104, 106, as shown, or may be remotely located and communicate with radar transceiver array 110 via, for example, a secure, wireless connection, as described above. In order to address privacy issues and concerns, image 122 may be provided by display 120 as an abstract figure (e.g., outline or line drawing type of image of subject 102 as opposed to a photographic type image of subject 102).

Figure 2:
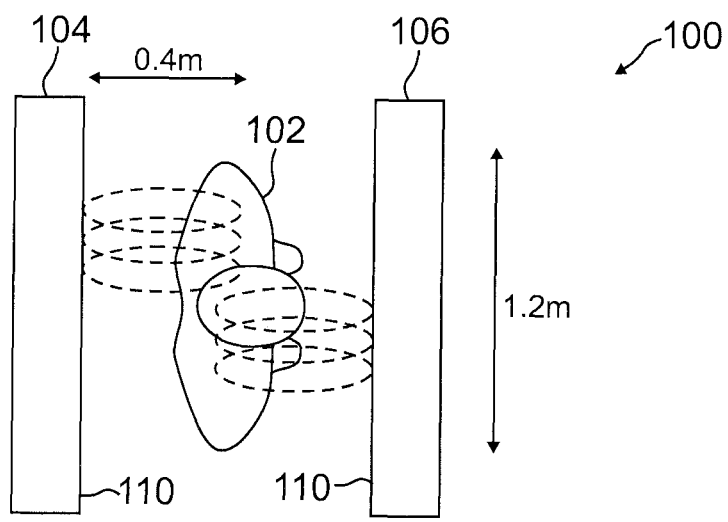
FIG. 2 is a plan view diagram showing part of the scanning system of FIG. 1, in accordance with one embodiment.

FIG. 2 shows a top view of panels 104, 106 of scanning system 100, with a subject 102 standing between the panels 104, 106. As seen in FIG. 2, width of radar transceiver arrays 110 may be about 1.2 meters (m) and subject 102 may be no more than about 0.4 m from radar transceivers (e.g., from an antenna element of a radar transceiver) of radar transceiver array 110. Thus, in the example illustrated, the aperture of radar transceiver array 110 may be about 1.2 m and subject 102 may be well within an aperture distance (0.4 m<1.2 m) of radar transceiver array 110, e.g., subject 102 is within a range smaller than the width of the aperture itself, or in what is referred to above as "extreme near-field" of radar transceiver array 110.

Figure 3A:
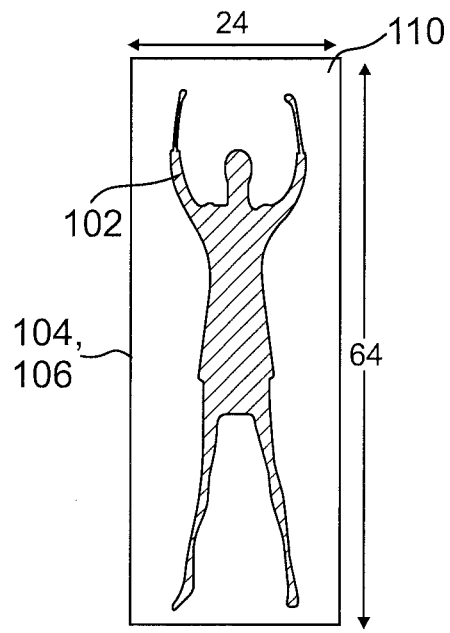
FIGS. 3A and 3B are elevation view diagrams illustrating examples of alternative scanner configurations for a scanning system and examples of imaging, in accordance with one or more embodiments.
Figure 3B:
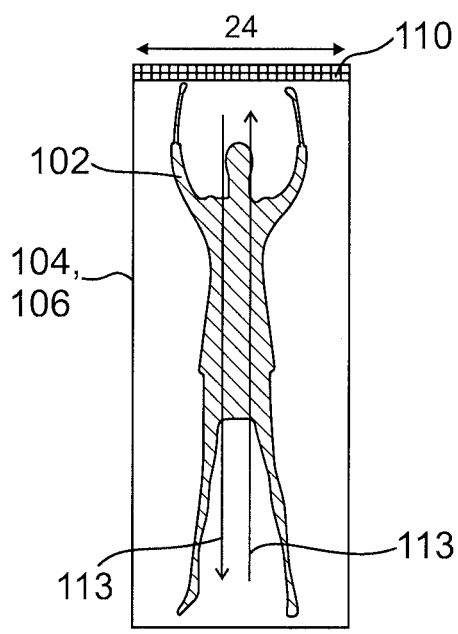

FIGS. 3A and 3B are side views illustrating examples of alternative configurations for radar transceiver array 110 for either of panel 104 or panel 106. FIG. 3A illustrates an example of a rectangular radar transceiver array 110 having 64 horizontal rows of radar transceivers with 24 radar transceivers in each row. In one embodiment, an implementation with a rectangular radar transceiver array 110 as shown in FIG. 3A may provide a fully electronic scanning system using an array of 24×64 (1,536) transceivers 1000 (e.g., transceiver with polarized antenna array pairs). The rectangular radar transceiver array 110 may be arranged as shown to cover a scanning area defined by panels 104, 106. In other words, the outline of panels 104 or 106 may be sufficient to surround a full size radar image of a subject 102, as shown, thus defining the area to be scanned and imaged behind or between panels 104, 106.

FIG. 3B illustrates another example of a radar transceiver array 110 having a single horizontal row of radar transceivers with 24 radar transceivers in the single row to form radar transceiver array 110 as a linear array. The linear array may be moved (e.g., using mechanical apparatus 112 which may include a track or rails, belt drive, and stepper motor) up and down, as indicated by arrows 113, so that the linear array can be used, for example, to scan the entire scanning area covered by rectangular radar transceiver array 110 shown in FIG. 3A, e.g., the entire scanning area defined by panels 104, 106.

Figure 4:
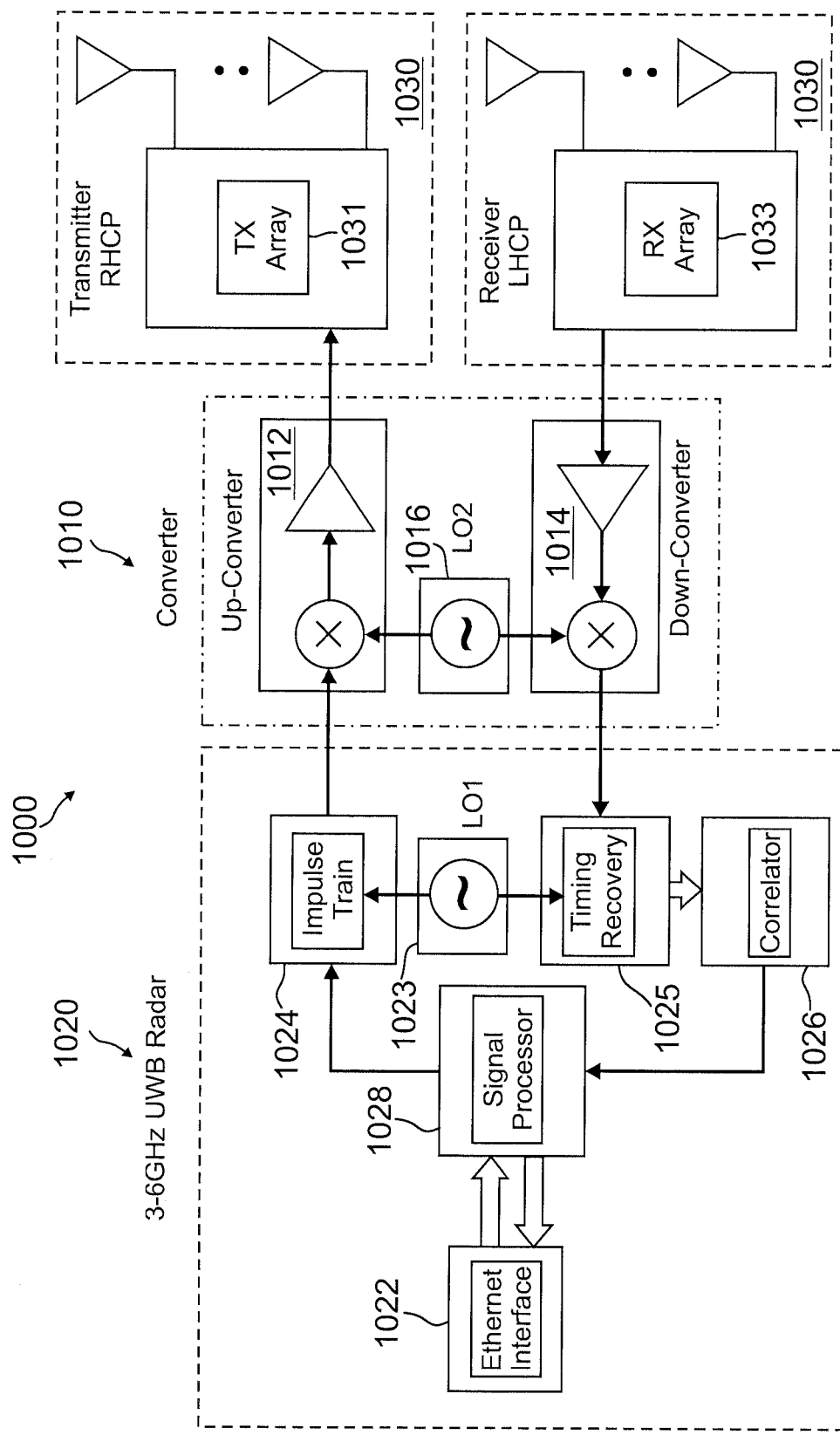
FIG. 4 is a schematic block diagram illustrating a radar transceiver for a scanning system, in accordance with an embodiment.

FIG. 4 illustrates a radar transceiver 1000 that may be included in an array of radar transceivers, e.g., radar transceiver array 110, for a scanning system 100. Radar transceiver 1000 may employ an ultra-wideband, or UWB, V-band RF module 1010, which interfaces to a primary microwave, UWB, GHz RF, and digital signal processor (DSP) processing unit 1020. Primary processing unit 1020 may provide a 5 GHz UWB scanner system. The 5 GHz (bandwidth) scanner system of primary processing unit 1020 may operate at 3 to 6 GHz. Another, alternative implementation of the scanner system of primary processing unit 1020 may operate at 1 to 6 GHz.

The microwave UWB RF sensor primary processing unit 1020 may be configured to process reflected signals from an object. On the other hand, the millimeter-wave, V-band RF module 1010 may provide the capability for a compact system 100 with miniaturized polarized antenna arrays 1030 that can provide such capabilities as material analysis using radar signature profiles. The V-band scanner, e.g., V-band RF module 1010, may operate at 57 to 64 GHz using up (transmit) and down (receive) conversion with the GHz RF module, e.g., primary processing unit 1020.

V-band RF module 1010 may include an up-converter 1012 and a down-converter 1014, as shown, with a local oscillator 1016, for converting between the operating frequencies of UWB RF sensor primary processing unit 1020 and the operating frequency desired to be used at antenna arrays 1030. Thus, V-band is used only as an example for illustration purposes. V-band RF module 1010 may provide up and down conversion for operation at other frequencies, e.g., X-band, V-band, E-band, W-band, or terahertz frequency bands.

Primary processing unit 1020 may include a local oscillator 1023 that provides timing signals to impulse train module 1024 and timing recovery module 1025. Primary processing unit 1020 may include a correlator 1026 and a signal processor 1028 (e.g., DSP). As shown in FIG. 4, radar transceiver 1000 may include an Ethernet interface 1022 in communication with signal processor 1028 so that the primary processing unit 1020 of each radar transceiver 1000 of radar transceiver array 110 can communicate its data for further processing.

Radar transceiver 1000 may transmit narrow radio frequency (RE) pulses at a certain pulse repetition frequency (PRF). For example, transceiver 1000 may emit RE radiation in the form of rapid wideband (narrow width) radar pulses at a chosen pulse repetition frequency (PRF) in the 1-100 MHz band. The pulses can penetrate various kinds of material—such as clothing, vinyl, and leather, that could be used for concealing contraband—with varying attenuation constant. Transceiver 1000 may, for example, transmit Gaussian pulses as short as 100 pico-seconds wide with center frequency in the 1-10 GHz band. Transceiver 1000 may receive radar signals and perform the required signal processing on a reflected pulse response to construct a digitized representation of the subject 102 (including, e.g., a concealed IED). Primary processing unit 1020 may extract and digitally process received amplitude and delay information.

Antenna array 1030 may include a transmit array 1031 and a receive array 1033. Transmit antenna array 1031 may be RHCP, as shown, or LHCP. Receive antenna array 1033 may be LHCP, as shown, or may be RHCP. Transmit antenna array 1031 and receive antenna array 1033 may have opposite polarizations, as shown, or may have the same polarization. Different combinations of polarization of the transmitter and receiver modules in the radar transceiver array 110 configuration may be used to optimize performance of the radar scanner system 100 for various applications. If the transmit signal in radar is circularly polarized, after a single metallic reflection the polarization may mirror, from left to right and vice versa. This mirroring could be an efficient way of detecting multiple reflections (e.g., from complex shapes) and single reflections (e.g., from simpler flat shapes) from objects under interrogation.

Radar transceiver 1000 may employ a wafer scale antenna and wafer scale beam forming as disclosed in U.S. Pat. No. 7,312,763, issued Dec. 25, 2007, to Mohamadi and U.S. Pat. No. 7,548,205, issued Jun. 16, 2009, to Mohamadi and virtual beam forming as disclosed in U.S. Pat. No. 8,237,604, issued Aug. 7, 2012, to Mohamadi et al., all of which are incorporated by reference. Wafer scale antenna modules (WSAM) are disclosed by U.S. Pat. No. 7,884,757, issued Feb. 8, 2011, to Mohamadi et al. and U.S. Pat. No. 7,830,989, issued Nov. 9, 2010 to Mohamadi, both of which are incorporated by reference. Depending on a particular application of a system, such as walk-through security screening, mechanical movement and steering of the beam may also be employed as disclosed in U.S. Pat. No. 7,697,958, issued Apr. 13, 2010 to Mohamadi, which is also incorporated by reference.

Figure 5:
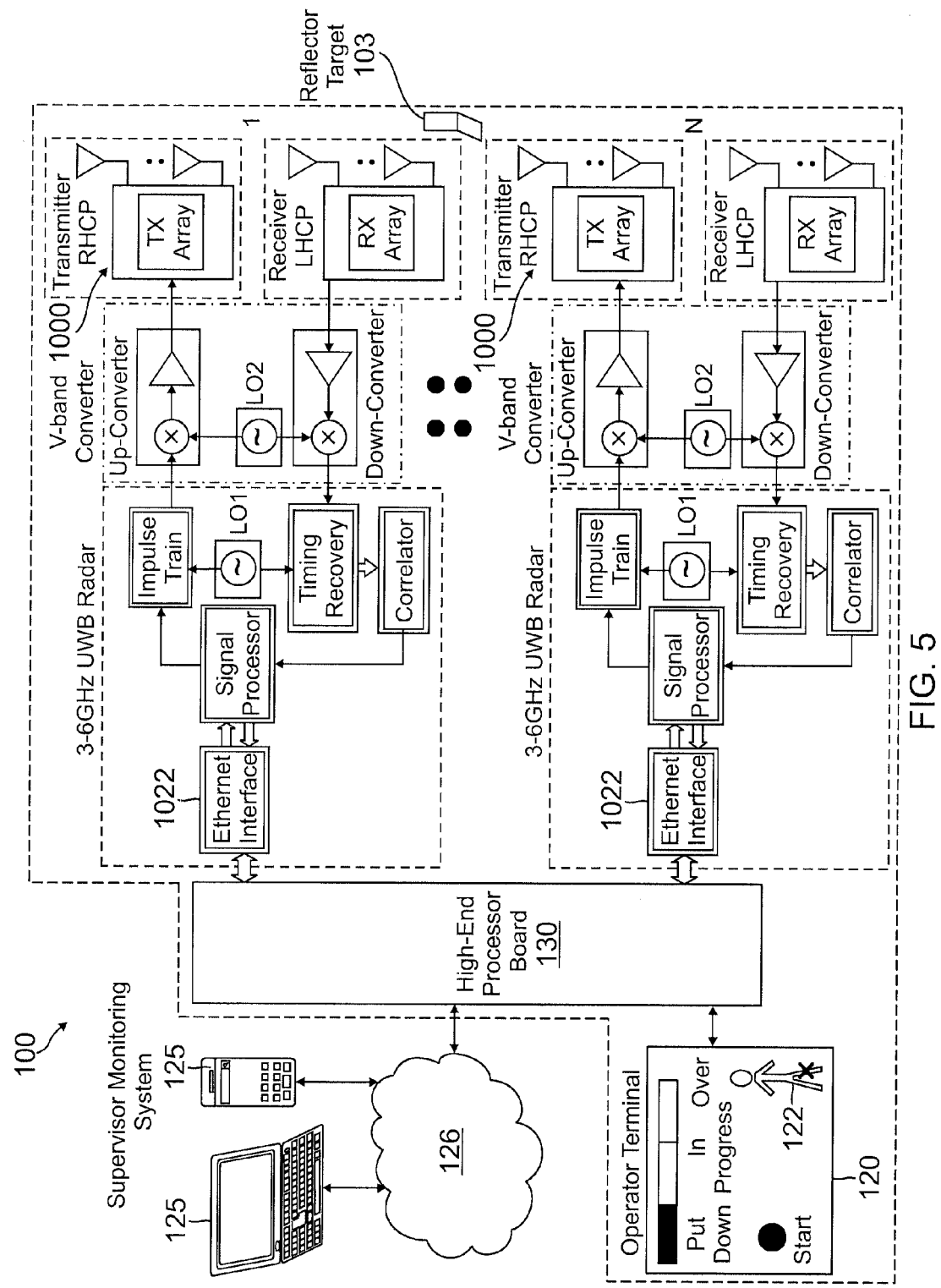
FIG. 5 is a system block diagram illustrating a scanning system, in accordance with one or more embodiments.

FIG. 5 illustrates a scanning system 100, in accordance with one or more embodiments. Scanning system 100 may include a number, N, of radar transceivers, such as radar transceiver 1000 illustrated in FIG. 4. N may be any number. For example, N may be 24×64=1536 radar transceivers 1000 for the embodiment described in FIG. 3A, or N may be 24 for the embodiment described in FIG. 3B. System 100 may use an array of transceivers 1000 in which each transceiver is a single chip radar transceiver realized in complementary metal oxide semiconductor (CMOS) process that may reduce the cost, weight, and energy consumption of system 100 compared to multi-chip radar transceiver implementations, may provide a set of completely isolated transceivers 1000 for system 100, may provide modularity of the system, and may facilitate extension of its application to person-borne IEDs (PBIED) at extended ranges.

In one embodiment, the system 100 may employ a linear array including one or more sets of eight single chip radar transceivers mounted on a single FR4 substrate printed circuit board. In one embodiment, three of the eight-single chip radar transceiver boards may be integrated to implement a 24-channels linear array for rapid millimeter-wave scan of the subject 102. One of the transceivers may be used as a transmitter and all of the eight or 24 transceivers may be used as receivers. The transmitted pulse may be, for example, a first order Gaussian pulse with a center frequency of 4.35 GHz and a bandwidth greater than 2.5 GHz. The receivers may use a sampling on a continuous time binary value to achieve a sampling rate of 40 giga-samples per second (GS/s).

Each transceiver 1000 may be connected via an Ethernet interface 1022 with a processor 130 that may, for example, perform processing that combines data from all transceivers 1000—whether in a rectangular array or a linear array that is moved to scan the scanning area defined by panels 104, 106—to provide an image, such as image 122, on a display 120. System 100 may also include a supervisor monitoring system 125 that may communicate with processor 130 via a network 126, as shown, which may include a private secure network, for example, or the Internet.

In system 100, an array of independent transceivers 1000 (using UWB radar of primary processing unit 1020 as intermediate frequency (IF) and up- and down-converters of RF module 1010 in RF) may be used for extreme near-field (as described above) imaging. In FIG. 5, an arrangement with an integrated IF (radar) board for each transceiver 1000 may operate at 1-10 GHz bandwidth. Results from a mathematical model of system 100 incorporating the inter-sample delay variations show that process variations are a strong influence on image degradation and a factor that is not easily rectified. In one or more embodiments, the problem of inter-sample delay variations may be addressed by direct calibration of the system 100 using one or more reflectors 103 (also referred to as a calibration target) positioned at known locations in the image.

Figure 6A:
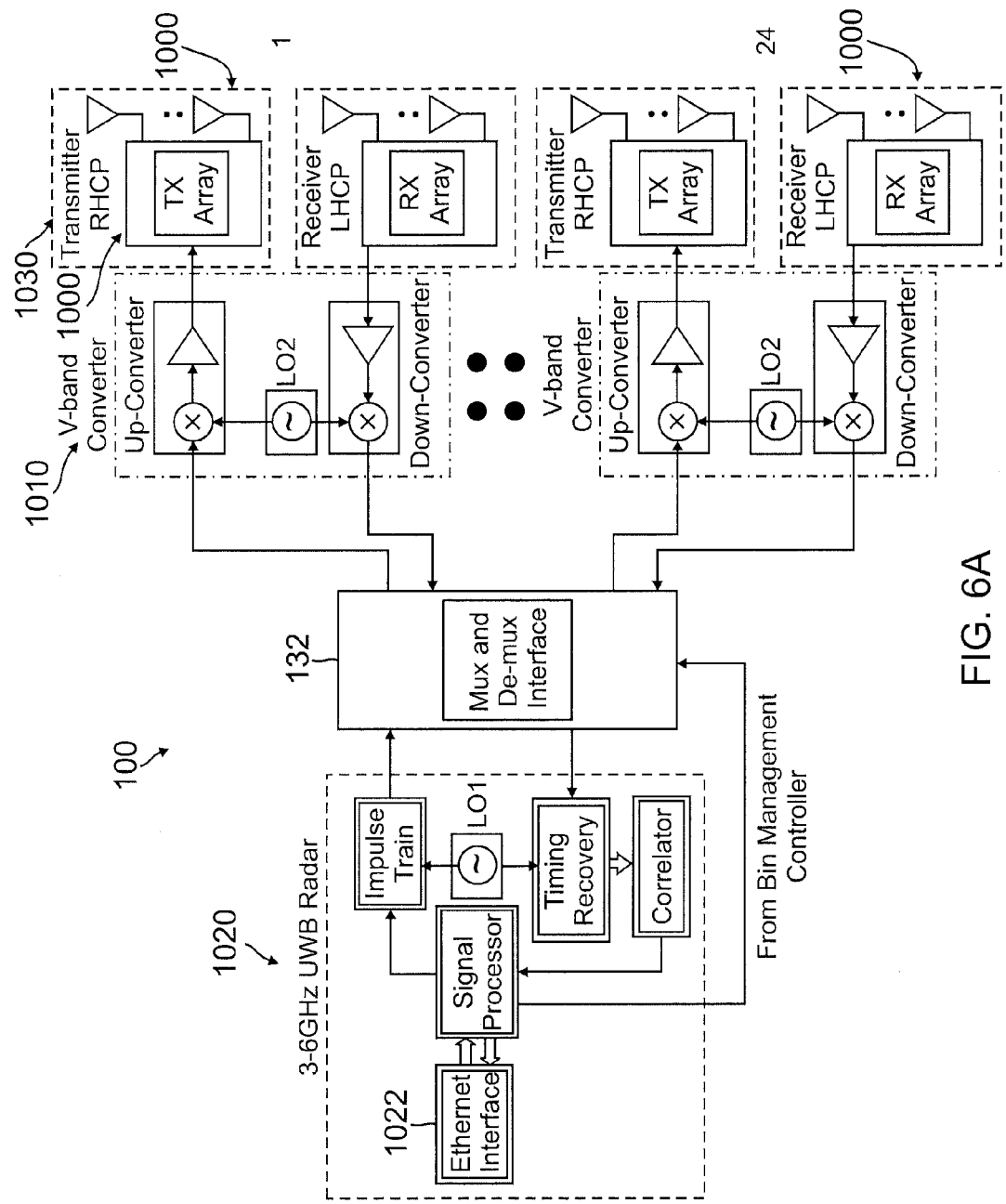
FIGS. 6A, 6B, and 6C are system block diagrams illustrating examples of alternative embodiments of a scanning system, in accordance with one or more embodiments.
Figure 6B:
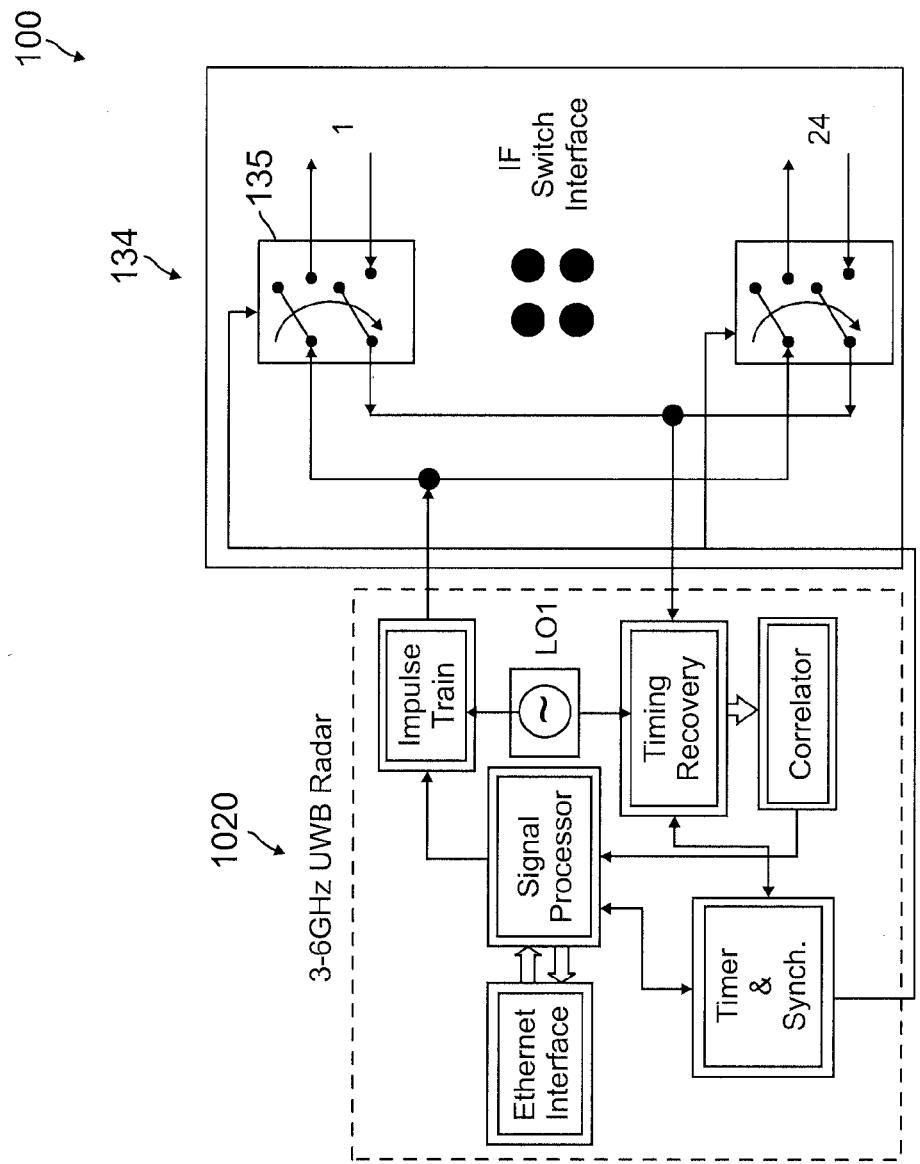
Figure 6C:
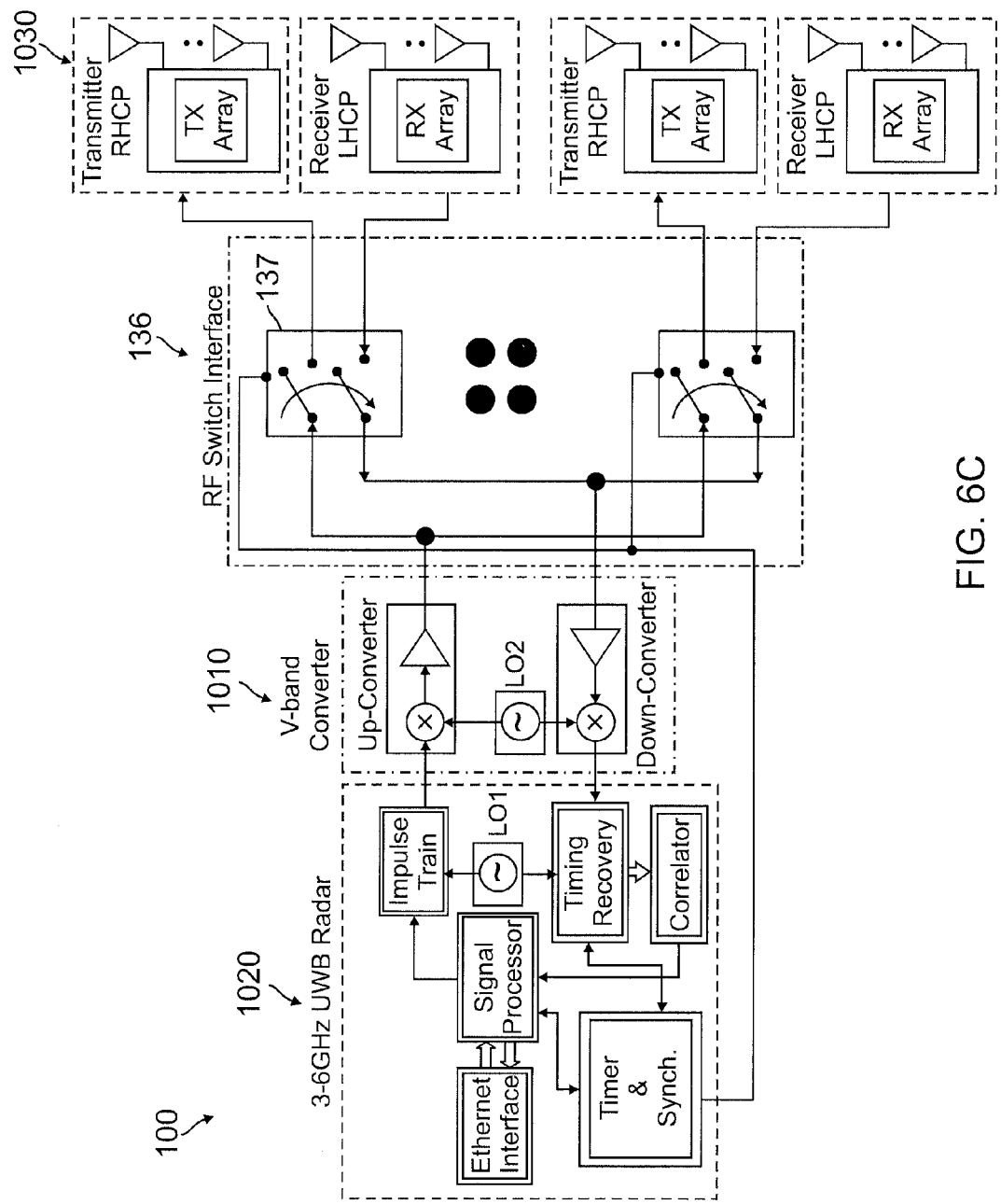

FIGS. 6A, 6B, and 6C illustrate examples of alternative embodiments of a scanning system 100. In FIG. 6A, an array of 24 transceivers 1000 may be implemented by multiplexing from a single primary processing unit 1020. The linear array of transceivers (e.g., transceiver cells, each with polarized pair—e.g. one RHCP, one LHCP—of antenna arrays of 16×16 antenna elements) and one multiplexor-de-multiplexor (mux-demux) processor 132 may be deployed at the expense of mechanical scan time of 3-5 seconds. Each scan may be performed from top to bottom, or bottom to top. FIG. 6A shows a modified circuit of FIG. 4 to enable 24 pair of polarized arrays (e.g., arranged as a linear array) to scan the subject 102 in a horizontal direction, while a step motor vertically increments the array 64 times for the entire height (e.g., 8 ft.) of the system 100. To further reduce cost, rate of interrogation by the scanner (transmit pulses and receiver waveforms) may be modified such that the same number of impulses gets transmitted and received synchronously to all 24 pairs of polarized arrays.

In FIG. 6B, an array of 24 transceivers 1000 may be implemented by the use of double pole switches 135 with high isolation that may be included in an IF switch interface 134 to time the routing of the 3-6 GHz TX/RX IF signal from the radar (e.g., primary processing unit 1020) to 24 V-band TX/RX front ends (e.g., V-band RF modules 1010). FIG. 6B may show a low risk, low cost (e.g., only one radar core), and low power consumption implementation at the expense of 24 times longer scan time than that for 24 independent transceivers 1000. Double pole switches 135 may be implemented, for example, on a chip in 130 nanometer (nm) 8HP (8HP is a proprietary name of IBM, Inc.) silicon germanium (SiGe) process that may be used to expand to a 1:24 matrix switch (e.g., IF switch interface 134). Because the routing may be done in IF (3-6 GHz), good isolation between channels (e.g., 24 channels) can be achieved (e.g., 40 dB isolation).

In FIG. 6C, an array of 24 transceivers 1000 may be implemented by the use of double pole switches 137 with high isolation may be included in an RF switch interface 136 to time the routing of the 3-6 GHz TX/RX signal from the radar (e.g., primary processing unit 1020) to its single V-band TX/RX (e.g., V-band RF module 1010) and then to all 24 array pairs (e.g., polarized antenna arrays 1030). FIG. 6C may show a moderate risk, low cost (e.g. only one radar core) implementation at the expense of 24 times longer scan time. The implementation of FIG. 6C may exhibit a lower power consumption and lower cost than even the implementation shown in FIG. 6B, and may provide a scanner system 100 with a smaller footprint. Because the routing may be done in RF (57-64 GHz), good isolation—although possibly not as good as in the case of IF isolation—between channels can be achieved (e.g., about 20-30 dB isolation).

Figure 7:
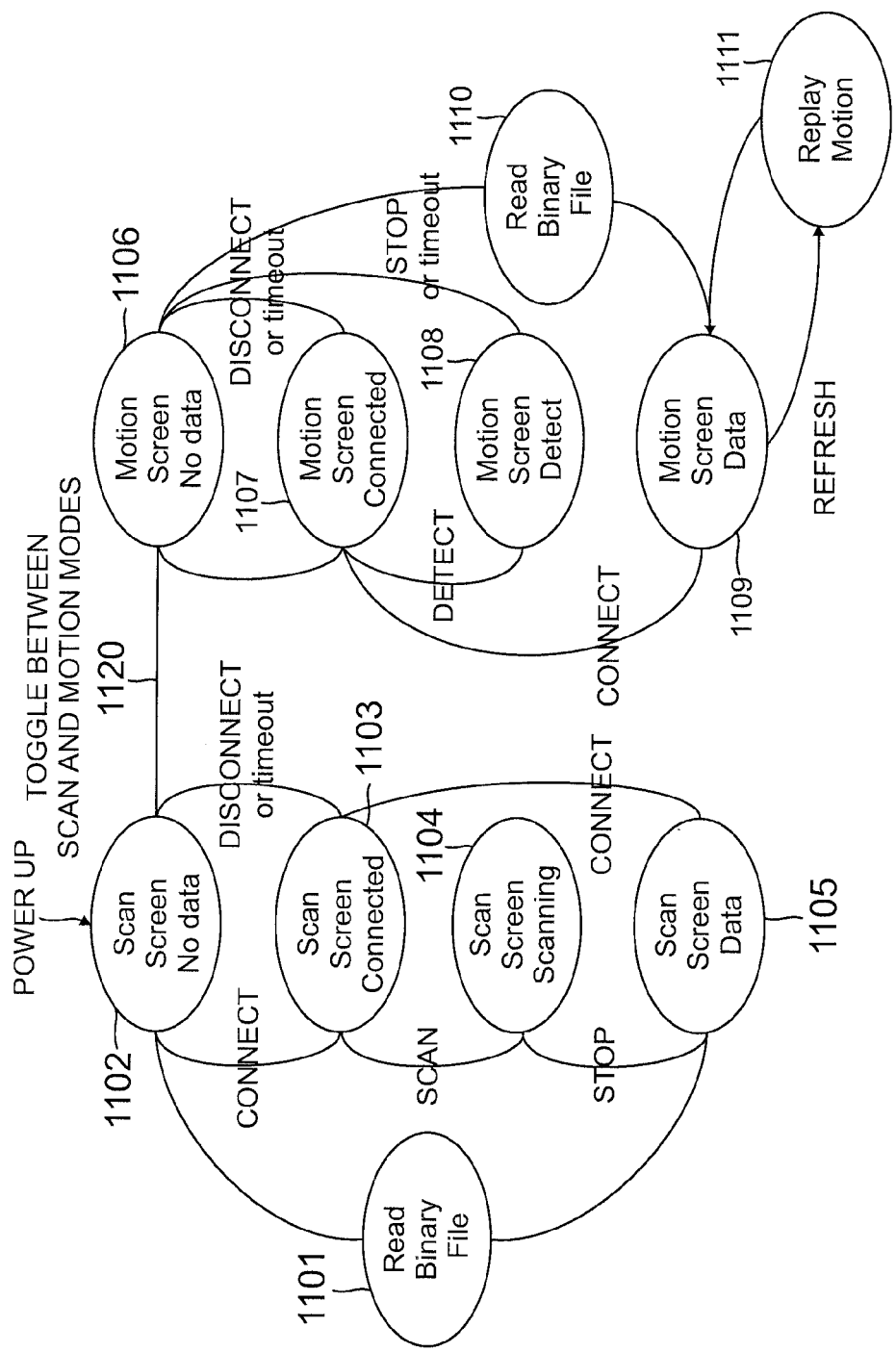
FIG. 7 is a state transition diagram for software for a scanning system in accordance with an embodiment.

FIG. 7 is a state transition diagram for software for a scanning system 100 in accordance with an embodiment. Software illustrated by FIG. 7 may include, for example, firmware and drivers operable with 5 GHz and 60 GHz RF imaging systems that can be used for detection in scanner system 100 of an IED or weapon carried by an individual (e.g., subject 102). The software may also be used for biorhythmic monitoring, e.g., biorhythmic pattern such as heartbeat and respiration, overlay with a composite video image, and detected RF image of suspected IED or weapon on an individual.

Software operating on a processor 130, for example, may provide various modes of functioning for scanning system 100. For example, states 1101 through 1105 may be entered when the system is in a scan mode, whereas states 1106 through 1111 may be entered when the system is in a motion mode. Toggling between the two modes may be provided, for example, by state transition 1120 which may be traversed in either direction between state 1102 and state 11006. States 1103, 1104 and states 1107 and 1108 may be entered, for example, when there is active radar transmission and the system may reside in any of the remaining states, e.g., 1101, 1102, 1105, 1106, 1109, 1110, or 1111, when radar transmission is not active. The various states and transitions between them, as illustrated by the example shown in FIG. 7, may provide for a variety of methods of functioning, for example, of radar scanning system 100.

Figure 8:
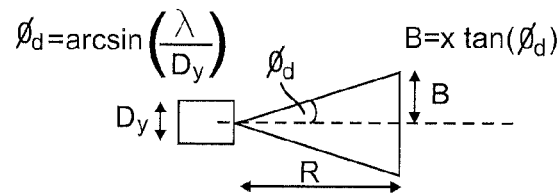
FIG. 8 is a diagram illustrating resolution estimation for a scanning system in accordance with one or more embodiments.

FIG. 8 illustrates resolution estimation for a radar scanning system 100 in which the range to the subject being scanned may be about the same or less than an aperture width of the radar scanner, in accordance with one or more embodiments.

Using synthetic aperture radar (SAR) techniques, lateral resolutions (e.g., horizontal resolutions for the radar transceiver array 110, shown in FIG. 1, 3A, or 3B, and having a width ($D_y$) of 1.2 m as shown in FIG. 2) may be estimated according to FIG. 8, using the following relationships: $\phi_d = \arcsin(\lambda/D_y)$ and $B = R \tan(\phi_d)$.

For 60 GHz, for example, the wavelength $\lambda_{60}$=5 millimeters (mm), $D_y$=1.2 m (see, e.g., FIG. 2), angle $\phi_d$=0.24°, and R=0.4 m (see FIG. 2) so solving the two relationships gives B=1.7 mm; thus, $B_{SAR}$=B/2=0.85 mm. For a 5 GHz example, the wavelength $\lambda_5$=60 mm, $D_y$=1.2 m (see FIG. 2), angle $\phi_d$=2.9°, and R=0.4 m (see FIG. 2) so solving the two relationships gives B=20 mm; thus, $B_{SAR}$=B/2=10 mm. Thus, radar scanning system can achieve less than 2 mm horizontal resolution at 60 GHz and 20 mm horizontal resolution at 5 GHz. The vertical resolution will be roughly half of the horizontal resolution as the vertical aperture—8 ft. or 2.4 m—is roughly twice the 2.1 m horizontal aperture. These fine resolutions may enable scanning system 100 to detect metal and non-metal structures reliably on the human body.

The distance very close to the antenna aperture (e.g., within about 2 ft. or 0.6 m to the person under screening) may be that which is used the most by scanning system 100. The electric field at these distances, which may be characterized by a range smaller than the width of the aperture itself, generally presents some difficulty in measuring signals at such close range. This extreme near-field area may be imaged by the use of several single chip radar transceivers 1000 employed in an array 110. Some factors in determining the quality of a radar image are the down-range and cross-range resolutions, and the dynamic range.

The down-range resolution, Δr, may be determined by the signal, or pulse, bandwidth, Δf, as follows:

$$\Delta r = \frac{c\tau}{2} \approx \frac{c}{2\Delta f} \quad (1)$$

where c is the speed of light, τ is the pulse duration in seconds.

The cross-range resolution, Δx, may be determined by the antenna spatial length or aperture width, D, the center frequency, f (or equivalent wavelength λ determined by fλ=c), and the range to the target, r, as follows:

$$\Delta x \approx kr\frac{\lambda}{D} \quad (2)$$

where k is a constant close to 1.0 that depends on the aperture and the measure of resolution. The cross-range resolution formula may be based on analysis for the narrow band, far-field case. Measurements for the wide-band, near-field case, however, may need to be compared to simulations of the system 100.

Another parameter that may be used for assessing image quality is the dynamic range of the image. Dynamic range in a radar image may be defined as the ratio of the highest peak to the noise floor and may be governed by the number of transmitting and receiving antennas and the signal to noise ratio (SNR). One commonly used method for measuring the dynamic range is the peak side lobe ratio (PSLR) that may compare the peak of the main lobe to the maximum value of the side lobes. The PSLR may be used for determining or comparing the dynamic range.

Figure 9:
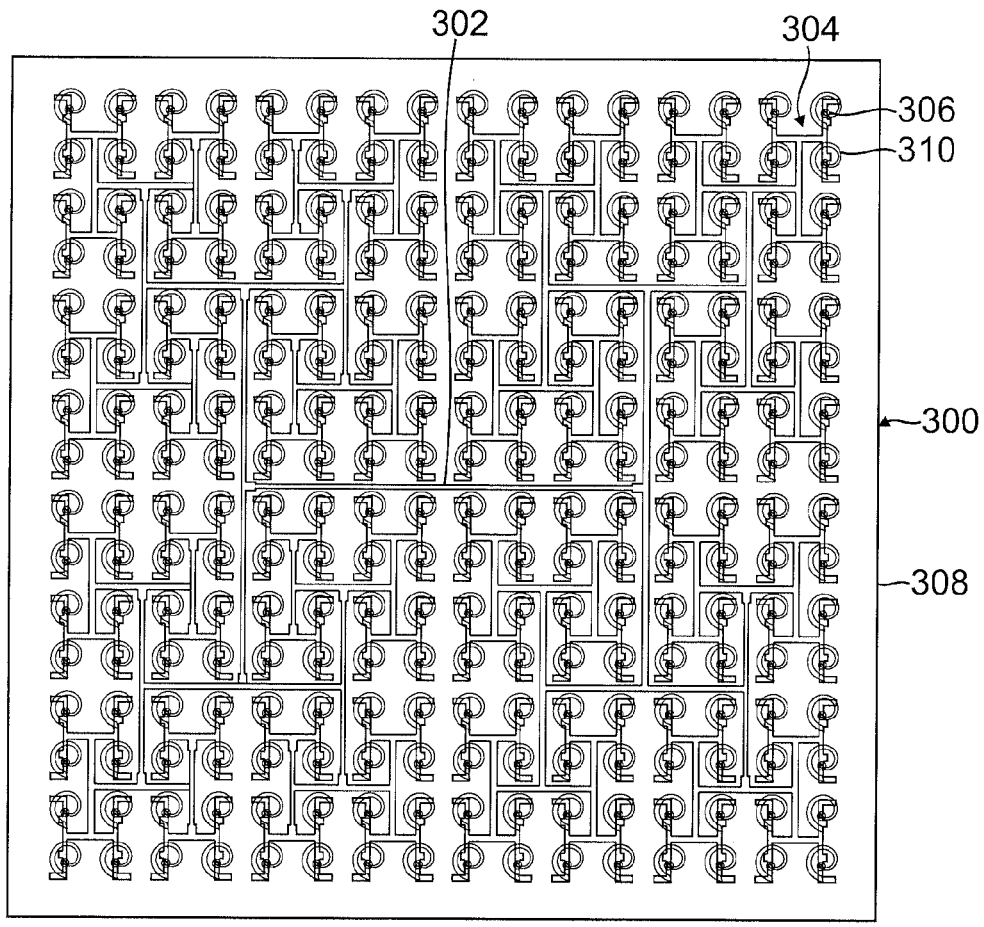
FIG. 9 is a plan view diagram showing antenna element and feed network layout for a circularly polarized, wafer scale antenna array, in accordance with an embodiment.

FIG. 9 illustrates an antenna element and feed network layout for a circularly polarized, wafer scale antenna array 300, which may be used, for example, to implement antenna arrays 1030. FIG. 9 shows an example configuration of 16-by-16 circularly polarized antenna array 300, which may also be referred to as a "cell". The total size of the 16-by-16 circularly polarized antenna array 300 may be about 42.5 mm-by-42.5 mm (about 1.7 inches), or even less. Scaling the 3-6 GHz UWB frequency to 57-64 GHz may allow antenna array 300 to be scaled at 100 times smaller footprint (e.g., linear dimension scaled at ⅒), while keeping the sensitivity of antenna array 300 intact.

FIG. 9 also shows antenna element and feed network layout for the 16-by-16 antenna element array 300, in accordance with an embodiment. Wafer scale antenna array 300 may be used, for example, to identify the phase of an object, in case that the array is used as part of a radar transmitter and receiver, e.g., radar transceiver 1000. In a fully integrated wafer-scale system, the array 300 may be fed from the center as seen in FIG. 9, showing a central array feed 302. Wafer scale antenna array 300 may include an H-tree feed network 304, vias 306, ground plane shield 308, and UWB spiral antenna plates 310 as a 16-by-16 wafer-scale LHCP array.

Figure 10A:
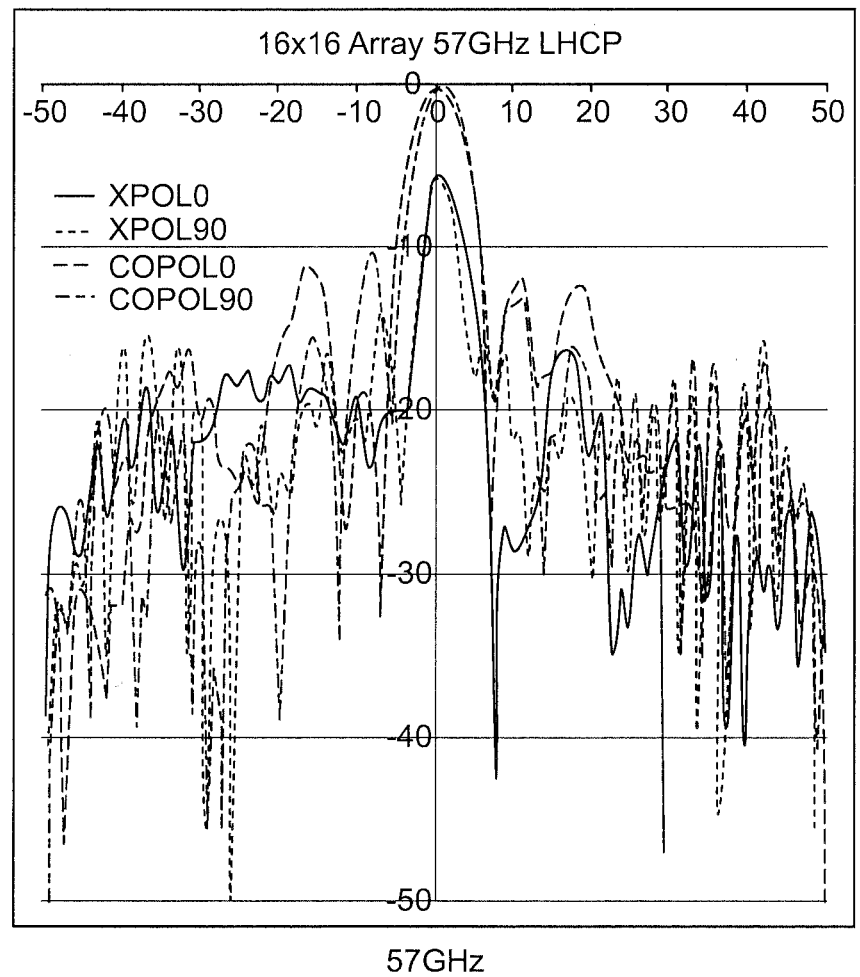
FIGS. 10A, 10B, and 10C are, respectively, graphs at each of three different frequencies showing co-polarization and cross polarization radiation patterns for left-hand circularly polarized, wafer scale antenna arrays, in accordance with one or more embodiments.
Figure 10B:
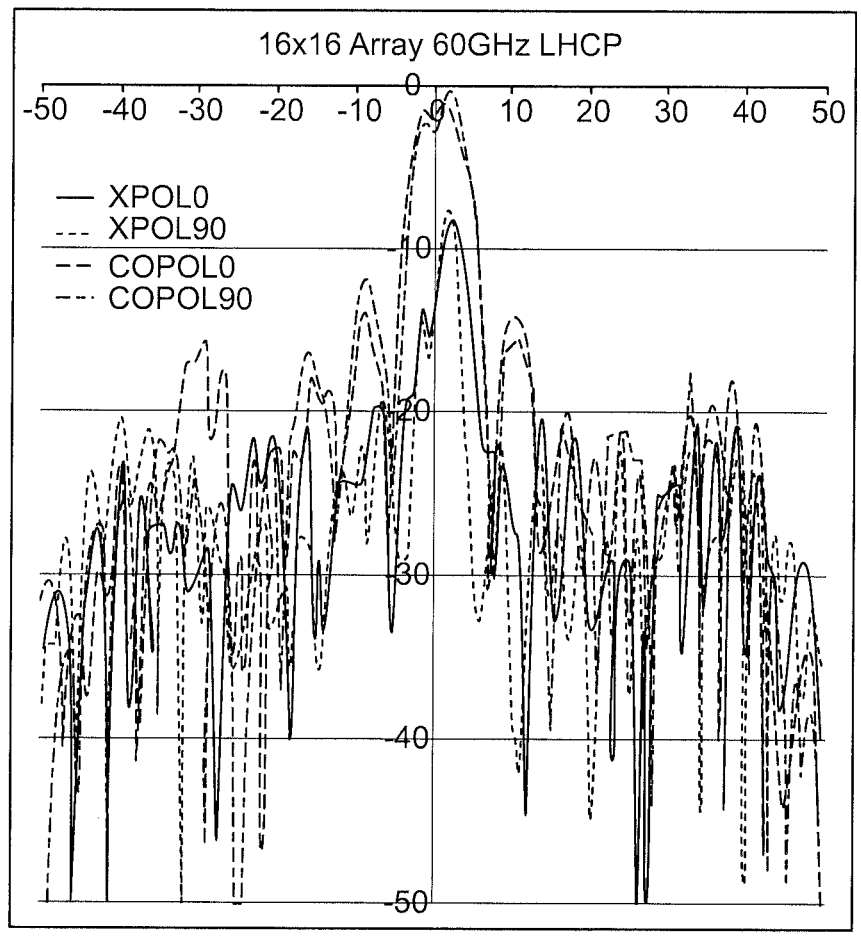
Figure 10C:
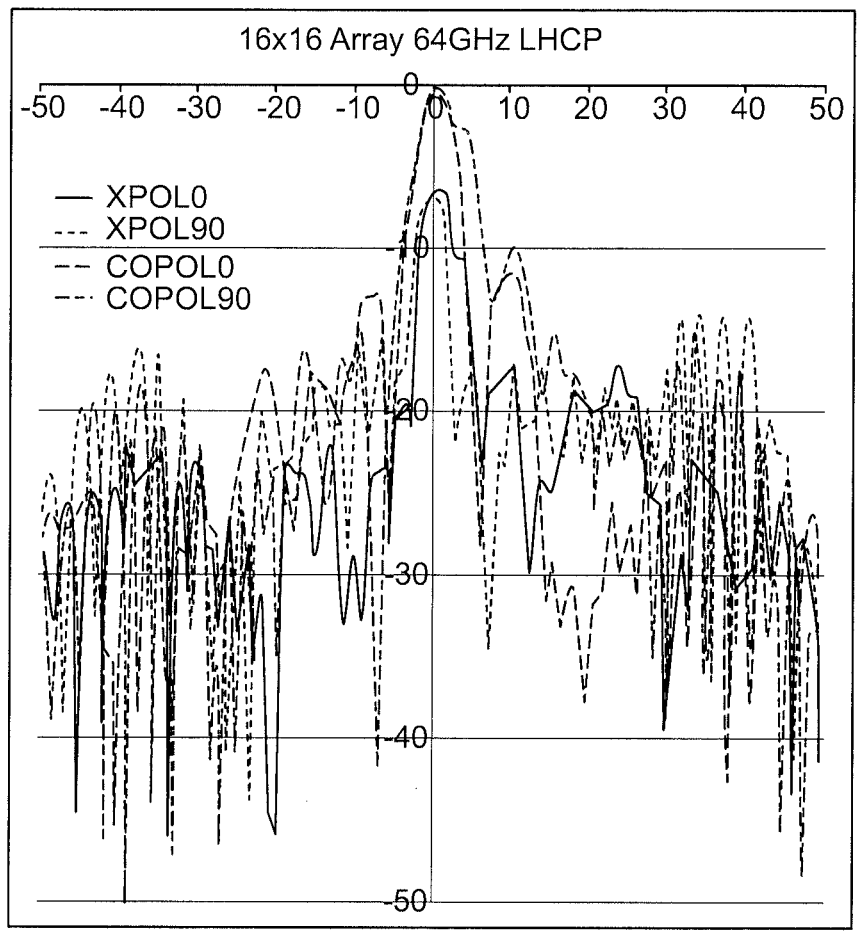

FIGS. 10A, 10B, and 10C present, respectively, graphs at each of three different frequencies showing co-polarization and cross polarization radiation patterns for a left-hand circularly polarized, wafer scale antenna array 300, in accordance with one or more embodiments. Examples of measured radiation patterns of the 16-by-16 circularly polarized antenna array 300 are shown in FIGS. 10A, 10B, and 10C for LHCP—RHCP patterns appear similar—at frequencies of 57, 60, and 64 GHz, respectively. It may be seen from the graphs that the cross-polar component is lower than 10 dB over the design frequency range 57-64 GHz. The directive gain of the array in one embodiment may be higher than 28 dBi.

Figure 11:
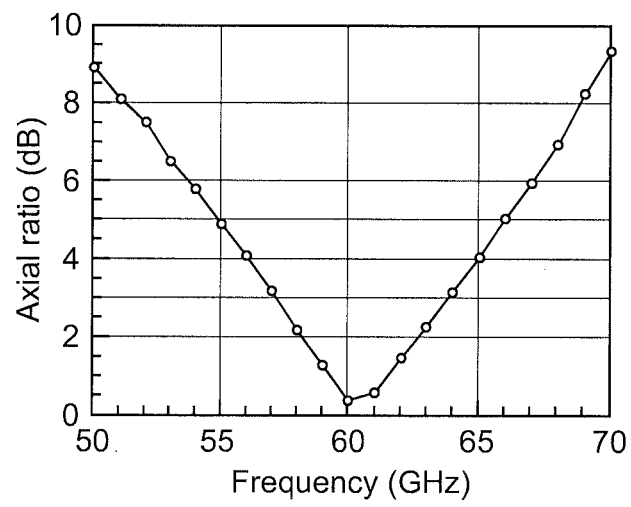
FIG. 11 is a graph illustrating axial ratio vs. frequency for a circularly polarized, wafer scale antenna array, in accordance with an embodiment.

FIG. 11 presents a graph illustrating axial ratio vs. frequency for a circularly polarized, wafer scale antenna array 300, in accordance with an embodiment. The axial ratio (AR) of the 16-by-16 circularly polarized, wafer scale antenna array 300 is plotted as a function of frequency in FIG. 11. As seen in FIG. 11, it may be found that the AR bandwidth for the 16-by-16 circularly polarized antenna array 300 may be about 11%, about 4 percent wider than that (7%) for an isolated single element antenna. This AR bandwidth can cover the required frequency range from 57 to 64 GHz. The bandwidth enhancement may be due to the coupling between array elements, which may lead to an increase in on-axis AR bandwidth for scanning element patterns.

Figure 12A:
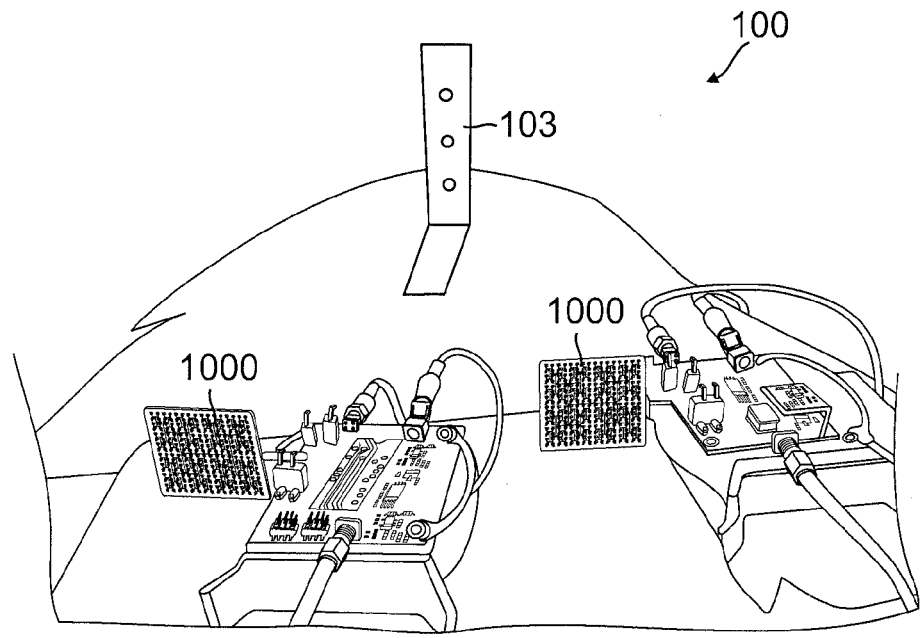
FIG. 12A is a perspective view showing a radar system with a calibration target for a scanning system.

FIG. 12A is a perspective view showing one or more radar transceivers 1000 with a calibration target, or reflector, 103 for a scanning system 100. Different combinations of transmit and receive antenna polarizations may calibrated using the reflector 103. For example, both transmit and receive antennas may have the same polarization—e.g., either LHCP/LHCP or RHCP/RHCP—or the transmit and receive antennas may have opposite polarizations—e.g., either RHCP/LHCP or LHCP/RHCP, respectively.

Figure 12B:
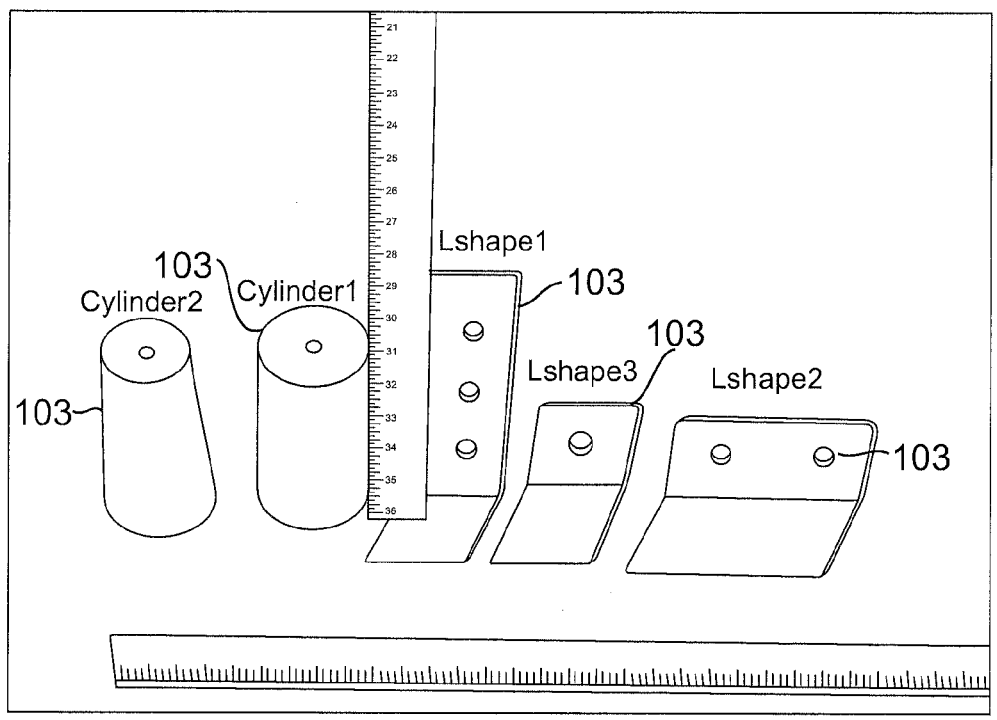
FIG. 12B is a perspective view showing a variety of test or calibration targets.

FIG. 12B is a perspective view showing a variety of reflectors or calibration targets 103. Shown in FIG. 12B are different metallic shapes that may be used to calibrate the capabilities of various RHCP vs. LHCP combinations. In all of the cases, same polarization (e.g., RHCP/RHCP) results have been compared with differing polarization (e.g., RHCP/LHCP) results. Of note is that even though the cylinder surface for the reflector labeled Cylinder-1 is not flat, the reflections off of this cylinder are strong and comparable to L-shape objects' reflections (see, e.g., FIG. 12D), which are flat. Such results may be explained by the sharp and narrow beam pattern of the 16-by-16 circularly polarized antenna array 300, for which the illuminated surface of the cylinder is still highly reflective due to the narrow beam.

Figure 12C:
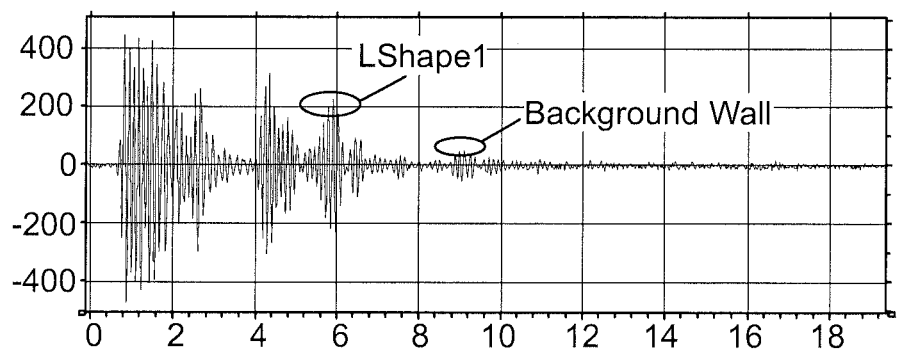
FIG. 12C is a graph of reflection waveforms using a first test combination of antennas.
Figure 12D:
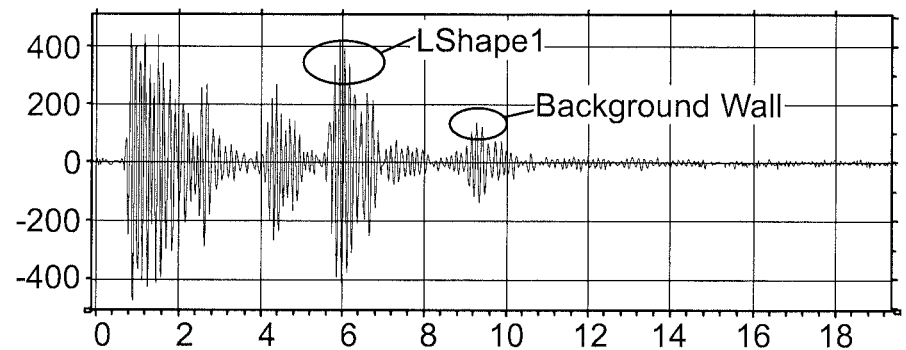
FIG. 12D is a graph of reflection waveforms using a second test combination of antennas, in accordance with one or more embodiments.

FIG. 12C is a graph of reflection waveforms using a first test combination of antennas in which both transmit and receive antennas have the same polarization, for example, either LHCP/LHCP or RHCP/RHCP. FIG. 12D is a graph of reflection waveforms using a second test combination of antennas in which the transmit and receive antennas have opposite polarizations, for example, either RHCP/LHCP or LHCP/RHCP. As can be seen from comparing FIG. 12C and FIG. 12D, there is a clear enhanced pattern of detecting an object (e.g., the calibration target) with differing polarizations for transmit and receive antennas.

Embodiments described herein illustrate but do not limit the disclosure. It should also be understood that numerous modifications and variations are possible in accordance with the principles of the present disclosure. Accordingly, the scope of the disclosure is best defined only by the following claims.

What is claimed is:

1. A system comprising:
    a plurality of radar transceivers disposed in a planar array, wherein:
        the planar array comprising the plurality of radar transceivers has an antenna aperture D; and
        the plurality of radar transceivers is configured to scan, by transmitting an ultra wideband (UWB) pulse signal, a subject within a range of at least one antenna of the plurality of radar transceivers, wherein the range is less than the aperture D; and
    a processor in communication with the plurality of radar transceivers, wherein the processor is configured to:
        process image data from the plurality of radar transceivers based on synchronized reflections of the UWB pulse signal received at each of the plurality of radar transceivers; and
        combine the image data using the synchronized reflections from the plurality of radar transceivers to construct a single image of the subject.

2. The system of claim 1, further comprising:
    a reflector positioned relative to the plurality of radar transceivers to provide data for a known location in the image, wherein:
        the processor uses the data for the known location in the image to calibrate processing of the image data from each of the plurality of radar transceivers.

3. The system of claim 1, wherein the at least one antenna of the plurality of radar transceivers includes:
    a planar antenna array comprising a plurality of right-hand circularly polarized (RHCP) antenna elements and left-hand circularly polarized (LHCP) antenna elements in a planar surface, wherein each antenna element includes a spiral plate;
    a feed network connecting a signal to each of the antenna elements; and
    a plurality of amplifiers dispersed in the feed network and configured to provide spatial power combining and beam forming of the signal.

4. The system of claim 1, wherein at least one of the plurality of radar transceivers includes:
    an image processor that combines processing from both RHCP reflected signals and LHCP reflected signals to detect single and multiple reflections from the subject.

5. The system of claim 1, wherein:
    one of the transceivers is used as a transmitter and all of the transceivers are used as receivers.

6. The system of claim 1, wherein:
    the plurality of radar transceivers are disposed as a rectangular array over a surface of a panel provided for a scanning area.

7. The system of claim 1, wherein:
    the plurality of radar transceivers are disposed as a linear array and the linear array moves to provide scanning over a surface of a panel provided for a scanning area.

8. A method for detecting concealed objects comprising:
    configuring a plurality of radar transceivers to form a planar array having an antenna aperture D;
    scanning a subject within a range of at least one antenna of the plurality of radar transceivers by transmitting an ultra wideband (UWB) pulse signal, wherein the range is less than the antenna aperture D;
    processing image data from the plurality of radar transceivers based on synchronized reflections of the UWB pulse signal received at each of the plurality of radar transceivers; and
    combining the image data using the synchronized reflections from the plurality of radar transceivers to construct a single image of the subject.

9. The method of claim 8, further comprising:
    calibrating processing of the image data from each of the plurality of radar transceivers using data for a known location in the image wherein:
    the data for the known location in the image is provided by a reflector positioned relative to the plurality of radar transceivers to provide data for the known location in the image.

10. The method of claim 8, further comprising:
    transmitting a radio frequency (RF) signal having a first circular polarity from at least one of the plurality of radar transceivers using an antenna element comprising a spiral plate configured to transmit signals having the first circular polarity; and
    receiving a reflection of the RF signal at one of the plurality of radar transceivers using an antenna element comprising a spiral plate configured to receive signals having a second circular polarity opposite of the first circular polarity.

11. The method of claim 8, wherein processing image data further comprises:
    combining processing from both RHCP reflected signals and LHCP reflected signals that detects single and multiple reflections from the subject based on comparison of transmitted and reflected polarizations.

12. The method of claim 8, further comprising:
    transmitting an RF signal from one of the transceivers and receiving a reflection of the RF signal at all of the transceivers.

13. The method of claim 8, further comprising:
    transmitting an RF signal and receiving a reflection of the RF signal at each of a rectangular array of radar transceivers comprising the plurality of radar transceivers.

14. The method of claim 8, further comprising:
    transmitting an RF signal and receiving a reflection of the RF signal at each of a linear array of radar transceivers comprising the plurality of radar transceivers; and
    moving the linear array of radar transceivers so as to scan a rectangular area using the linear array of radar transceivers.

15. A walk-through scanning station comprising:
    a first panel and a second panel configured for a subject to pass between the first and second panels;
    a planar array of radar transceivers disposed behind the first panel; wherein:
        the planar array of radar transceivers has an antenna aperture D; and
        the planar array of radar transceivers is configured to scan, by transmitting an ultra wideband (UWB) pulse signal, the subject within a range of at least one antenna of the array of radar transceivers, wherein the range is less than the aperture D;

an image processor in communication with the array of radar transceivers and configured to:
- process image data from the plurality of radar transceivers based on synchronized reflections of the UWB pulse signal received at each of the plurality of radar transceivers; and
- combine the image data using the synchronized reflections from the plurality of radar transceivers to construct a single image of the subject; and a display in communication with the image processor for displaying an image of the subject scanned by the array of radar transceivers.

16. The scanning station of claim 15, wherein:
at least one of the array of radar transceivers includes a right-hand circularly polarized (RHCP) antenna element and a left-hand circularly polarized (LHCP) antenna element; and
the image processor combines processing from both RHCP reflected signals and LHCP reflected signals to detect single and multiple reflections from the subject based on mirroring between LHCP and RHCP signals.

17. The scanning station of claim 15, wherein:
one of the radar transceivers is used as a transmitter and all of the radar transceivers are used as receivers.

18. The scanning station of claim 15, wherein the system includes:
a reflector positioned relative to the array of radar transceivers to provide data for a known location in the image, wherein:
the image processor uses the data for the known location in the image to calibrate processing of the image data from each of the array of radar transceivers.

19. The scanning station of claim 15, wherein:
the array of radar transceivers comprises at least one wafer scale antenna array; and
an axial ratio bandwidth of the at least one wafer scale antenna array is at least 10%.

20. The scanning station of claim 15, wherein:
the array of radar transceivers are disposed as a linear array and the linear array is moved to provide scanning over a rectangular area of a surface of at least one of the first panel and the second panel.

\* \* \* \* \*

UNITED STATES PATENT AND TRADEMARK OFFICE
CERTIFICATE OF CORRECTION

PATENT NO. : 9,316,732 B1
APPLICATION NO. : 13/794449
DATED : April 19, 2016
INVENTOR(S) : Farrokh Mohamadi Page 1 of 1

It is certified that error appears in the above-identified patent and that said Letters Patent is hereby corrected as shown below:

IN THE SPECIFICATION

In Column 6, Line 9, change "(RE)" to --(RF)--.

In Column 6, Line 10, change "RE" to --RF--.

Signed and Sealed this
Fifth Day of July, 2016

Michelle K. Lee
*Director of the United States Patent and Trademark Office*